United States Patent [19]

Wallestad

[11] Patent Number: 5,322,353
[45] Date of Patent: Jun. 21, 1994

[54] VALVE ASSEMBLY FOR A VEHICLE AIR BRAKE SYSTEM

[75] Inventor: Steven D. Wallestad, Kansas City, Mo.

[73] Assignee: Midland Brake, Inc., Kansas City, Mo.

[21] Appl. No.: 13,588

[22] Filed: Feb. 4, 1993

[51] Int. Cl.[5] .............................................. B60T 13/00
[52] U.S. Cl. ........................................... 303/7; 303/37; 303/82
[58] Field of Search ................. 303/7, 9, 28, 37, 82, 303/69

[56] References Cited

U.S. PATENT DOCUMENTS

| Re. 30,205 | 2/1990 | Carton et al. | 303/7 |
|---|---|---|---|
| 4,014,580 | 3/1977 | Bridigum | 303/37 |
| 4,042,281 | 8/1977 | Ury | 303/29 |
| 4,080,004 | 3/1978 | Ury | 303/9 |
| 4,157,849 | 6/1979 | Wickham | 303/82 |
| 4,163,585 | 8/1979 | Ury | 303/9 |
| 4,182,535 | 1/1980 | Fannin | 303/9 |
| 4,226,482 | 10/1980 | Stable | 303/37 |
| 4,472,001 | 9/1984 | Fannin | 303/9 |
| 4,565,120 | 1/1986 | Gray et al. | 92/130 |
| 4,593,954 | 6/1986 | Campanini | 303/7 |
| 4,915,456 | 4/1990 | Gross et al. | 303/9 |
| 5,236,250 | 8/1993 | Moody et al. | 303/7 |

*Primary Examiner*—Matthew C. Graham
*Attorney, Agent, or Firm*—Leydig, Voit & Mayer Ltd.

[57] ABSTRACT

A valve assembly for use with spring-set air-release vehicle parking brakes comprises a particular arrangement of conventional components providing desired spring brake operational characteristics heretofore requiring costly, complex specially-designed units. The valve assembly typically employs a plurality of interconnected check valves in combination with pressure protection and quick release valves to provide the desired characteristics. These include a system whereby at startup pressurized air from the tractor fills the trailer reservoir tanks and the spring brake chambers simultaneously. The valve assembly also assures that if during tractor-trailer operation the supply air from the tractor is severed or otherwise lost, service brake air in the trailer reservoir tanks is retained at a sufficient pressure to provide adequate service brake operation. Similarly, if pressurized air in the trailer reservoir tanks is lost, sufficient pressure is maintained in the system to keep the spring brakes released for safe parking of the tractor-trailer combination.

6 Claims, 3 Drawing Sheets

VALVE ASSEMBLY FOR A VEHICLE AIR BRAKE SYSTEM

The invention hereafter disclosed relates to a valve assembly used with spring-set air-release parking brakes which are a part of a vehicle air brake system.

BACKGROUND OF THE INVENTION

Spring-set air-release parking brakes, also referred to as spring brakes, are commonly utilized in trailers and heavy duty over-the-highway trucks and the like. Various valve assemblies have heretofore been specially designed and used to obtain desired operational characteristics for these spring brakes, as hereinafter set forth. Such valve assemblies are in most instances capable of providing these operational characteristics.

Such prior valve assemblies, however, are beset with one or more shortcomings. These include the fact that a) the valve assembly embodies an inordinate number of components; b) the assembly is of complex and bulky construction; c) the assembly is difficult to integrate with other existing braking components of the vehicle; and d) the assembly is unduly costly.

SUMMARY OF THE INVENTION

An improved valve assembly for spring-set air-release parking brakes has been provided which avoids or minimizes the aforenoted shortcomings. A feature of the invention is that the improved valve assembly utilizes a particular combination of conventional valves, including inexpensive check valves, rather than a plurality of independent expensive complex spring brake module valves. Moreover, in addition to a non-complex design employing simple components, with which those skilled in the brake arts are familiar, the improved valve assembly is of sturdy, compact construction, may be readily incorporated in existing vehicle braking systems and complies with current statutory regulations, e.g., Federal Motor Vehicle Safety Standard No. 121 (FMVSS 121).

Further and additional advantages of the improved valve assembly will become apparent from the description, accompanying drawings and appended claims.

In accordance with one embodiment of the invention, an improved valve assembly employing conventional components is provided for use with spring-set air-release vehicle parking or spring brakes. The valve assembly is designed so that at startup pressurized air from the tractor supply fills the trailer reservoir tanks and spring brake chambers simultaneously. This assures that the spring brakes will remain applied and the trailer will not move until there is sufficient pressure in the reservoir tanks on the trailer to assure adequate operation of the trailer service brakes, a so-called anti-driveaway feature.

The improved valve assembly of the present invention also assures that if during tractor-trailer operation the pressurized supply air from the tractor is lost or otherwise released, pressurized air in the trailer reservoir tanks is retained to assure adequate operation of the trailer service brakes. Similarly, if the pressurized air in the trailer reservoir tanks is lost or otherwise released, sufficient pressure is maintained in the system to keep the spring brakes released for a finite period and to permit safe parking, thereby avoiding the "dynamite" application of the spring brakes and the consequent disruption and danger to highway traffic.

The trailer braking system which advantageously employs the valve assembly of the present invention may otherwise be of conventional design. Thus, it may include a conventional air supply, usually from the tractor, adapted to be pressurized to the operational level, a reservoir for accumulating air at a brake release pressure which may be higher than the operational level pressure, and spring and service brake assemblies.

The novel valve assembly itself includes a first valve unit which typically may take the form of what is known in the brake arts as a pressure protection valve. Such first valve unit has a housing provided with a first inlet connected to the vehicle braking system air supply; an outlet for separately communicating with both the reservoir and the spring brakes; and a second inlet in fluid communication with said first inlet. Disposed within the housing is a pressure responsive piston having one end adjacent the outlet and a second end having a valve component mounted thereon and adapted, when the piston is in a first position, to sealingly engage a valve seat located within the housing. The piston is biased to assume the first position wherein there is no communication between the outlet and the first or second inlets.

The housing outlet is connected to the reservoir by a first conduit. A first check valve is disposed within the first conduit intermediate the housing outlet and the reservoir and allows one-way air flow into the reservoir when there is sufficient pressure differential, albeit small, on the check valve (as is the case with the other check valves employed in the valve assembly of the present invention). A second conduit is also connected to said housing outlet, either directly or at one end to the first conduit at a location intermediate the housing outlet and the first check valve.

A second similar check valve is located in the second conduit allowing only one-way air flow from the first conduit to the second conduit. The second conduit is in fluid communication with both the second inlet in the housing of the first valve unit via a third similar one-way check valve and an inlet formed in the housing of a second valve unit which typically may take the form of what is known in the brake arts as a quick-release valve. The housing is provided with at least one outlet spaced from the inlet and communicating with a chamber for the vehicle parking or spring brakes. The housing of the second valve unit is also provided with an exhaust port spaced from the inlet and outlet.

A pressure-responsive diaphragm is disposed within the interior of the housing of the second valve unit and segregates the interior thereof into a first portion communicating with the inlet, and a second portion communicating with the outlet. The diaphragm is adapted to assume three modes. When in the first mode, the diaphragm blocks communication between the inlet, outlet and exhaust port. When in the second mode, the diaphragm is deflected, thereby effecting communication between the inlet and outlet and blocking communication between the outlet and the exhaust port. When in the third mode, the diaphragm is deflected effecting blockage between the inlet and outlet and communication between the outlet and the exhaust port. The diaphragm assumes the third mode when the parking or spring brake chamber is to be exhausted of compressed air, thereby allowing the brakes to be automatically set. As those skilled in the art will recognize, the aforesaid second valve unit functions as a conventional quick release valve.

BRIEF DESCRIPTION OF THE DRAWINGS

The present invention may be more clearly understood from the following description of a specific and preferred embodiment read in conjunction with the accompanying drawings, wherein.

Figure 1:
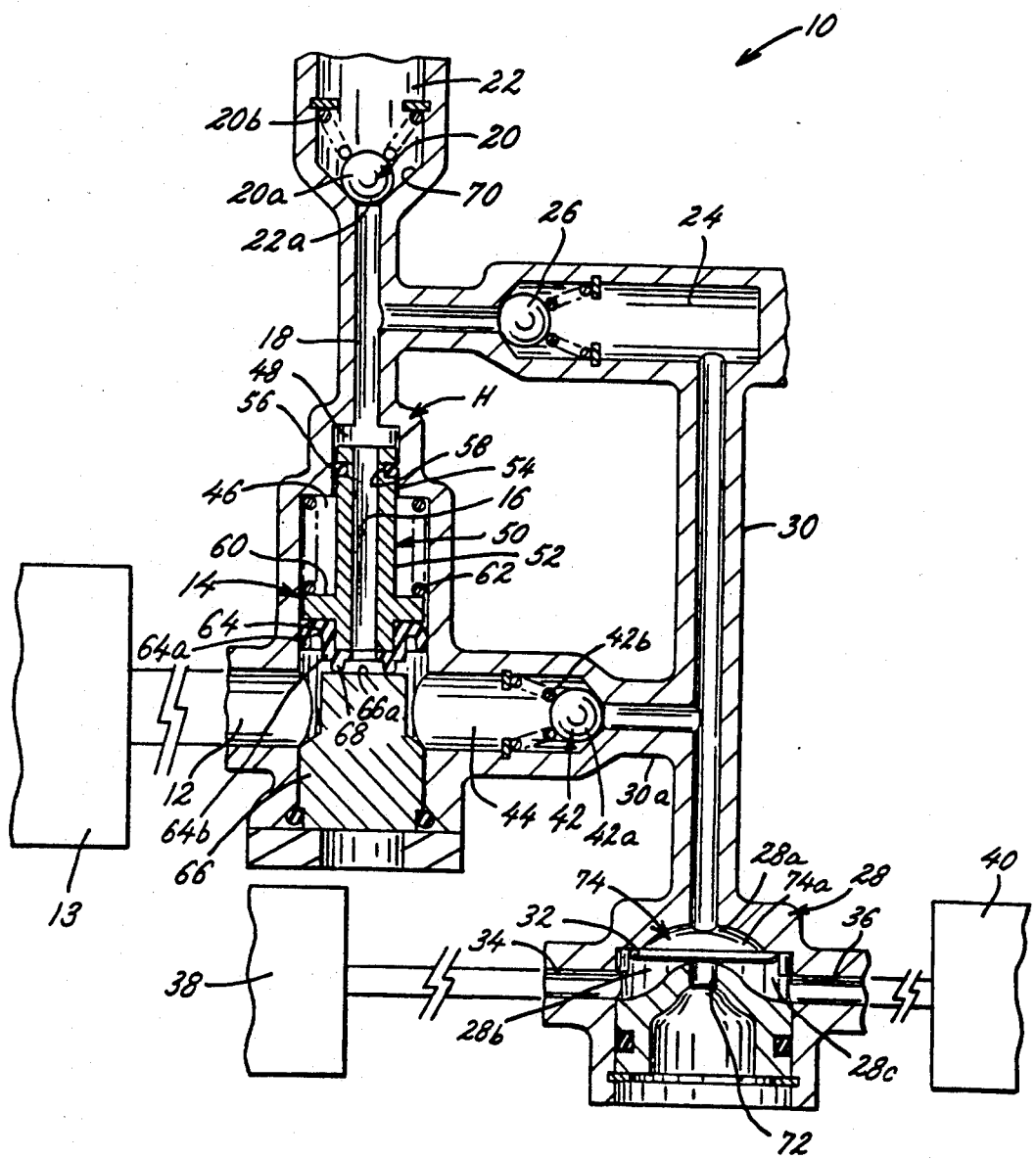
FIG. 1 is a partial vertical sectional view of a preferred embodiment of the improved valve assembly showing the components thereof subject to ambient or customary operating pressure.

It should be understood that the drawings are not necessarily to exact scale and that certain aspects may be illustrated by graphic symbols, schematic representations and fragmentary views. It should also be understood when referring to physical relationships of components, such relationships usually have reference to the orientation depicted in the drawings. Actual embodiments or installations thereof may differ, depending upon the particular trailer braking system for which the valve assembly is designed, particularly in view of the fact that the valve assembly of the present invention advantageously lends itself to assembly from various conventional inexpensive, commercially-available check valves, pressure protection valves and quick release valves, all of which may vary in configuration. Accordingly, while the drawings depict an integral assembly, it should be understood that it may advantageously be assembled from readily-available multiple components which are bolted or otherwise secured together.

While much mechanical detail, including other plan and section views of the particular embodiment depicted have been omitted, such detail is not per se part of the present invention and is considered well within the comprehension of those skilled in the brake and valve arts without further amplification in the light of the present disclosure.

While the invention will be described in connection with a preferred embodiment, there is no intent to limit it to such an embodiment. On the contrary, the intent is to cover all alternatives, modifications, and equivalents included within the spirit and scope of the invention commensurate with the advance made over the prior art.

DETAILED DESCRIPTION OF THE DRAWINGS

Referring to FIG. 1 an improved full function valve assembly 10 is shown which incorporates the concepts of this invention. The valve assembly 10 includes a housing H for a first valve unit having a first inlet 12 formed therein which leads from a pressurized air supply 13 (e.g., about 110-130 psig, typically about 120 psig) to a first valve 14 mounted within the housing, e.g., a pressure protection valve. Valve 14 is biased to normally assume a closed position, as will be described more fully hereafter, and requires a predetermined pressure differential in order to overcome the spring bias on the first valve 14. First valve 14 is provided with a longitudinally extending passageway 16 which is in communication with a first conduit 18. Conduit 18 leads to a first check valve 20 which is disposed between valve 14 and passageway 22 to a pressurized air reservoir (not shown), usually in the form of one or more tanks, a plurality of tanks being in series or parallel.

A second conduit 24 is provided with an end thereof connected to conduit 18 at a location between valve 14 and first check valve 20. A second check valve 26 is disposed within conduit 24 adjacent an end thereof. The second conduit 24 is connected by conduit 30 to the housing 28 of a second valve unit, e.g., a quick release valve. Housing 28 includes an interior pressure-responsive diaphragm 32 which controls flow from the conduits 24 and 30 to first and second ports 34 and 36 formed, respectively, in housing 28. Each port is in communication with respective spring brake chambers symbolically shown at 38 and 40. The spring brakes and chambers therefore may have a construction such as disclosed in U.S. Pat. No. 4,565,120, dated Oct. 2, 1990.

Conduit 30 is provided with a laterally extending conduit 30a which is disposed upstream of housing 28. Conduit 30a is provided with a third check valve 42 which blocks reverse flow between conduit 30 and a second inlet 44 formed in valve housing H. Inlets 12 and 44 are in communication with one another within the interior of housing H. The check valves 20, 26 and 42 may be of conventional, inexpensive ball-type valves. For reasons readily apparent to those skilled in the art in the light of this disclosure, first cavity 46 is vented to the ambient atmosphere by conventional means, e.g., a small aperture in valve housing H, optionally with a vent cover.

Figure 2:
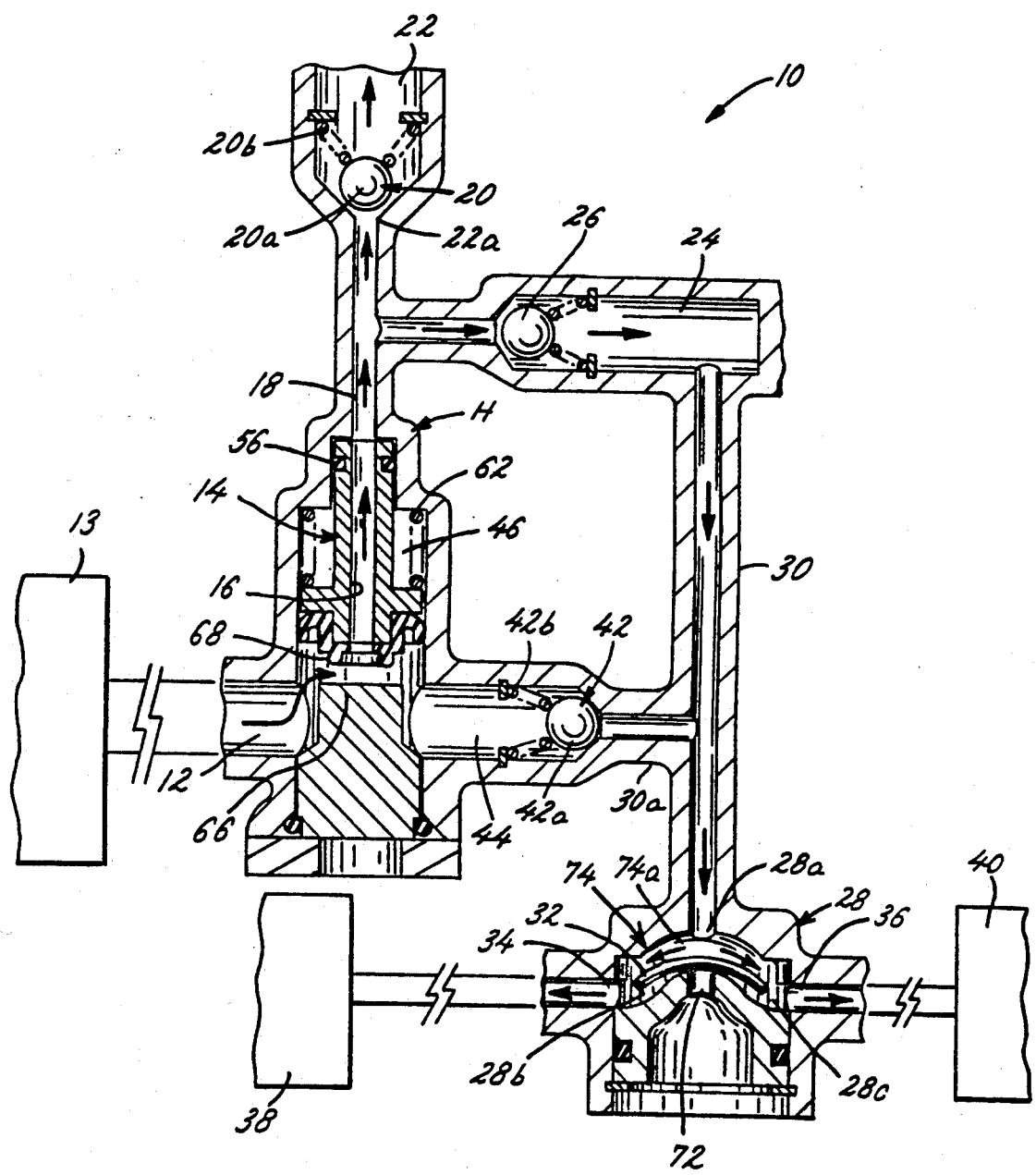
FIG. 2 is similar to FIG. 1 but showing the valve assembly when the reservoir and the spring brake chambers are being filled with compressed air from the air supply.

Under predetermined operating conditions, air from source 13, e.g., a line from the tractor, and the first inlet 12 builds up in pressure until it reaches a first predetermined pressure, e.g., about 45-85 psig, typically about 70 psig, whereby pressure protection valve 14 opens and the pressurized air flows into the reservoir via conduits 18 and 22 and into the brake chambers 38 and 40 via conduits 24 and 30 and the quick release valve. This is depicted in FIG. 2. The spring set parking brakes (not shown) are released at about 30-70 psig, typically about 40 psig. As those skilled in the art will recognize, such parking or spring brake release pressure (e.g., about 40 psig) should be less than the pressure differential at which pressure protection valve 14 opens (e.g., about 70 psig).

Pressure protection valve 14 may be of conventional design and is slidably disposed within a spring-containing first cavity 46 of a cylindrical configuration formed within the housing interior. Valve 14 includes a reciprocating piston 50 having a hollow cylindrical stem section 52. The upper end portion 54 of stem section 52 is in sliding, sealing engagement within cavity 48. In order to prevent leakage between cavity 48 and the exterior surface of stem portion 52, a first seal means 56 (e.g. an O-ring) is disposed within an external groove 58 formed in the upper end portion 54 of the stem section.

The lower portion of piston 50 is provided with a lateral external collar or flange 60 which is disposed within first cavity 46 and is spaced from the lower end of the piston. The periphery of collar 60 is preferably in sliding contact with the surface of cavity 46. The collar is in abutting engagement with one end of a biasing spring 62 disposed within the first cavity 46. The opposite end of spring 62 abuts the upper end of the first cavity.

The bias spring 62 causes valve piston 50 to assume a closed position preventing air flow from the air supply 13 and inlet 12 to the reservoir and spring brake chambers 38 and 40. The lower end of piston 50 is provided with a valve piece 64 which is adapted to normally sealingly engage a valve seat 66 which is disposed within housing H and located between inlets 12 and 44. The resilient valve piece 64, which may be rubber or rubber-like, encompasses the lower end of passageway 16.

In order that air may flow from the air supply 13 past valve 14 to the spring brake chambers 38 and 40, the air supply pressure must overcome the bias exerted on piston 50 by biasing means 62 causing the piston 50 to be raised and the valve piece 64 to be unseated from valve seat 66. The valve piece 64 may be of any suitable configuration but is preferably an annular lip-type seal that includes an outer peripheral portion 64a which sealingly engages the surface of cavity 46. The valve piece also has an inner portion 64b which is provided with a depending annular rib 68. The rib 68 is adapted to sealingly engage the surface 66a of valve seat 66.

The air supply pressure is exerted on the underside of the outer portion 64a of the lip seal 64. Once the air supply has reached a predetermined pressure, the valve piece 64 will assume the raised position depicted in FIG. 2, allowing the pressurized air from the air supply 13 to flow up through the stem passageway 16, conduit 18, one-way valve 26, conduit 24, and conduit 30 to the second valve housing 28. As pressure builds above the diaphragm 32 within the housing 28, diaphragm 32 will be distorted as seen in FIG. 2 allowing the pressurized air to continue to flow into chambers 38 and 40.

The passageway 22 to the reservoir is simultaneously charged with pressurized air from the air supply 13 upon unseating ball 20a of check valve 20. Valve 20 may be of any suitable configuration, but, as aforementioned, is preferably a conventional, inexpensive ball type wherein the ball 20a thereof is biased by a spring 20b to normally assume a closed position with respect to a valve seat 70 encompassing the reservoir entry passage 22a. The reservoir is provided with suitable conduits and connections, not shown, which communicate with a second section or service brake chamber in each brake actuator. The service brakes of the vehicle, including the trailer, are normally controlled by a foot pedal located in the vehicle cab.

The second valve housing 28 is provided with a first port 28a which communicates with an end of conduit 30. Housing 28 also is provided with at least a second port 34 and/or 36 in communication with the spring brake chambers 38 and 40. To permit exhaust of the spring brake chambers thereby allowing automatic setting of the parking brakes, the housing 28 is provided with an exhaust or third port 72.

The aforementioned diaphragm 34 segregates a cavity 74 formed within the housing into a first portion 74a communicating with first port 28a and second portions 28b and 28c communicating with ports 34 and 36, respectively. Thus, when the pressure in the conduits 24 and 30 exceeds the pressure in ports 34 and 36, the diaphragm 32 will be deflected downwardly, as seen in FIG. 2. This results in the flow of pressurized air from conduits 24 and 30 into portion 74a of cavity 74, past diaphragm 32 into portions 28b and 28c, and then into the respective spring brake chambers 38 and 40.

Figure 3:
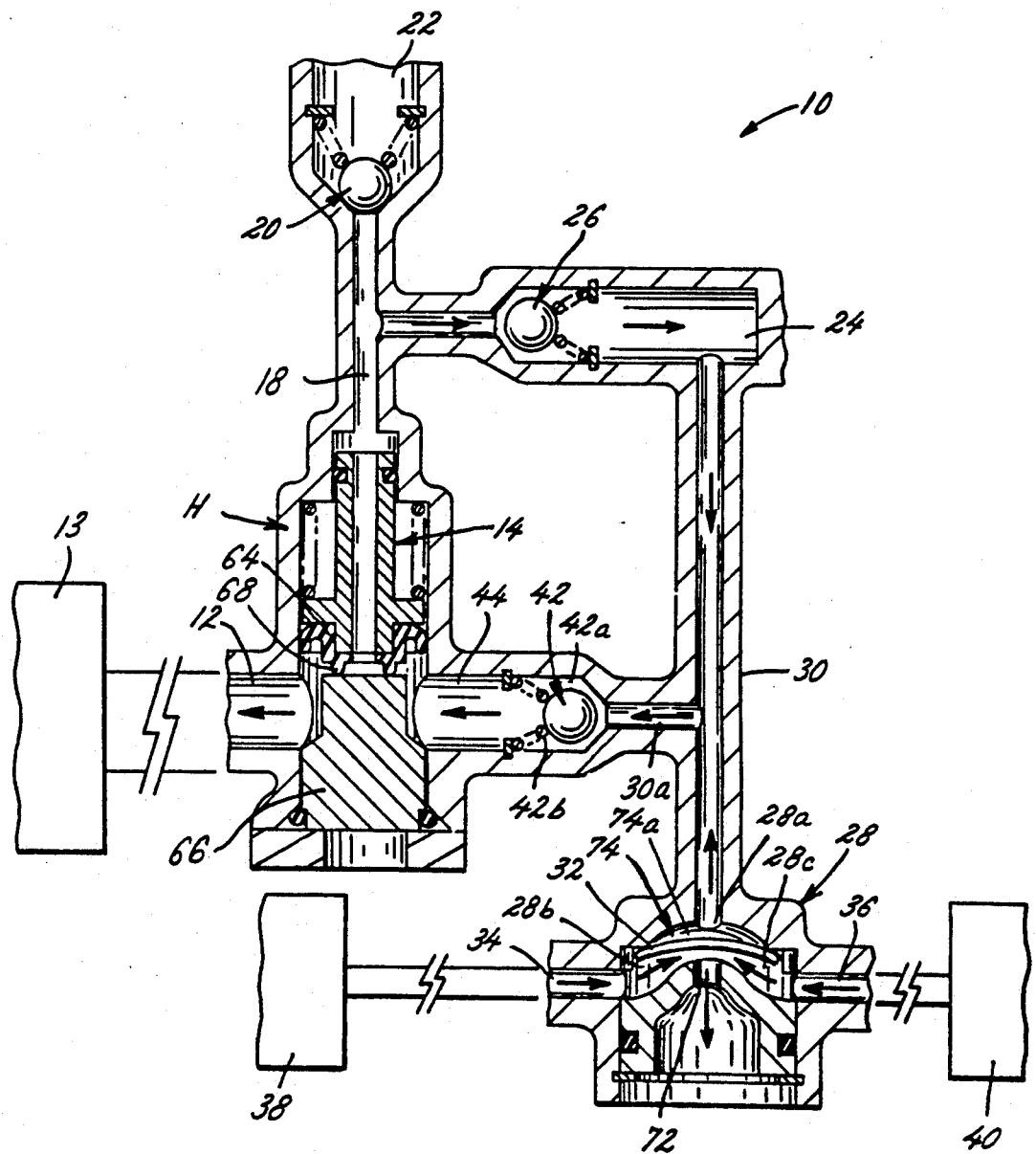
FIG. 3 is similar to FIG. 1 but showing the valve assembly when the air supply is inoperative such as occurs when the vehicle is not operating or the pressure within the air supply is below a predetermined operating level and the spring brake chambers are in an exhaust mode.

The spring brakes are automatically applied by releasing pressurized air from the spring brake chambers 38 and 40 to less than about 40–50 psig. This occurs when the chamber pressures exceed the pressure within conduits 24 and 30, causing diaphragm 32 to deflect upwardly, as seen in FIG. 3. This causes flow from ports 34 and 36 into cavity portions 28b and 28c and out through exhaust port 72 to the atmosphere. Thus, diaphragm 32 automatically permits quick releasing of the parking brakes when the pressure within the air supply 13 falls below the predetermined operational level of the vehicle braking system.

In order to cause the parking or spring brakes to automatically set when the system pressure is low, the pressure within conduits 24 and 30 must be released. Venting of such pressure is permitted through the aforementioned conduit 30a past check valve 42 and into port 44. Check valve 42 is provided with a ball 42a which is biased by a spring 42b to a closed position preventing flow from port 44 to conduit 30a. When the pressure in conduit 30a exceeds the bias pressure, air flows past the check valve 42 into the interior of housing H around the periphery of valve seat 66. Thus, once venting of conduits 24, 30 and 30a has occurred diaphragm 32 is automatically deflected upwardly as shown in FIG. 3, exposing exhaust port 72.

As already indicated, valve diaphragm 32 has three operating modes typical of quick release valves: a first mode, as shown in FIG. 1, wherein the diaphragm assumes a substantially planar configuration blocking communication between conduit 30 and ports 34 and 36, and between ports 34 and 36 and exhaust port 72; a second mode, as shown in FIG. 2, wherein the periphery of diaphragm 32 is deflected downwardly effecting communication between conduit 30 and ports 34 and 36 while simultaneously blocking communication between ports 34 and 36 and exhaust port 72; and a third mode, as shown in FIG. 3 wherein a center portion of diaphragm 32 is bowed upwardly effecting communication between ports 34 and 36 and exhaust port 72 while simultaneously blocking communication between conduit 30 and ports 34 and 36.

The first operating mode of diaphragm 38 occurs when the pressure differential on opposite surfaces of the diaphragm does not exceed a predetermined amount, taking into account the inherent resiliency of the diaphragm material. The second operating mode of the diaphragm occurs when the pressure within cavity portion 74a exceeds the pressure within cavity portions 28b and 28c. The third operating mode occurs when the pressure within cavity portion 74a is less than the pressure within cavity portions 28b and 28c.

By combining conduits 18, 24, 30 and 30a, conventional check valves 20, 26, and 42, conventional pressure protection valve 14, and conventional quick release valve 28, a pressure regulating system 10 of compact construction is provided which incorporates a minimal number of components of conventional and inexpensive design.

The aforementioned individual components of conventional design may be readily installed in existing brake systems and are easy to service and maintain. Moreover, the improved assembly may be readily modified and customized to accommodate air brake systems of varying size and capacity. Yet the combination performs the sophisticated functions herein outlined without resorting to costly, complex valve structures.

It is to be understood that, as already set forth, the allowed claims based on this application are to be accorded a range of equivalence commensurate in scope with the advance made over the prior art.

What is claimed is:

1. A valve assembly for use with spring-set air-release parking brakes forming a portion of a vehicle braking system, the latter including a supply of pressurized air and a reservoir for storing pressurized air for brake application, said valve assembly comprising:
   (a) a first valve unit having a first inlet for fluid communication with said supply of pressurized air and a second inlet in fluid communication with said first inlet, a first outlet, and means for establishing fluid communication between said first and second inlets and said outlet when the air pressure at said first and second inlets exceeds a predetermined level;
   (b) a second valve unit having at least a first port, a second port and an exhaust port, said the first port being in internal fluid communication with said second port only when the pressure at said first port exceeds that at the second port; said second port being in internal fluid communication with said exhaust port only when the pressure at said first port is less than the pressure at said second port; said second port being in external fluid communication with said spring-set air-release parking brakes;
   (c) said outlet of said first valve unit having a first one-way fluid communication means to said reservoir;
   (d) said outlet of said first valve unit having a second one-way fluid communication means to said first port of said second valve unit; and
   (e) said outlet of said first valve unit having said second one-way fluid communication means and, in series therewith, a third one-way fluid communication means to said second inlet of said first valve unit.

2. The valve assembly of claim 1 wherein said first, second and third one-way fluid communication means comprise one-way check valves and associated fluid passageways.

3. The valve assembly of claim 1 wherein said first valve unit comprises a pressure protection valve.

4. The valve assembly of claim 1 wherein said second valve unit comprises a quick release valve.

5. A valve assembly for use with spring-set air-release parking brakes forming a portion of a vehicle braking system, the latter including a supply of pressurized air and a reservoir for storing pressurized air for brake application, said valve assembly comprising:
   (a) a pressure protection valve having a first inlet for fluid communication with said supply of pressurized air and a second inlet in fluid communication with said first inlet, a first outlet, and means for establishing fluid communication between said first and second inlets and said outlet when the air pressure at said first and second inlets exceeds a predetermined level;
   (b) a quick release valve having at least a first port, a second port and an exhaust port, said the first port being in internal fluid communication with said second port only when the pressure at said first port exceeds that at the second port; said second port being in internal fluid communication with said exhaust port only when the pressure at said first port is less than the pressure at said second port; said second port being in external fluid communication with said spring-set air-release parking brakes;
   (c) said outlet of said pressure protection valve having first one-way fluid communication means to said reservoir;
   (d) said outlet of said pressure protection valve having a second one-way fluid communication means to said first port of said quick release valve; and
   (e) said outlet of said pressure protection valve having said second one-way fluid communication means and, in series therewith, a third one-way fluid communication means to said second inlet of said pressure protection valve.

6. The valve assembly of claim 5 wherein said first, second and third one-way fluid communication means comprise one-way check valves and associated fluid passageways.

* * * * *